(12) United States Patent
Fiore et al.

(10) Patent No.: US 8,231,489 B2
(45) Date of Patent: *Jul. 31, 2012

(54) ONE PIECE BELT INSTALLATION/REMOVAL GUIDE

(75) Inventors: Steven J Fiore, Hilton, NY (US); Brian J Perry, Bloomfield, NY (US)

(73) Assignee: Xerox Corporation, Norwalk, CT (US)

( * ) Notice: Subject to any disclaimer, the term of this patent is extended or adjusted under 35 U.S.C. 154(b) by 1063 days.

This patent is subject to a terminal disclaimer.

(21) Appl. No.: 12/051,533

(22) Filed: Mar. 19, 2008

(65) Prior Publication Data

US 2009/0239694 A1    Sep. 24, 2009

(51) Int. Cl.
*F16H 7/22* (2006.01)
(52) U.S. Cl. ...................................................... 474/122
(58) Field of Classification Search .................. 474/101, 474/109, 111, 140, 144
See application file for complete search history.

(56) References Cited

U.S. PATENT DOCUMENTS

| 5,246,404 | A  | * | 9/1993  | Ojima ........................... 474/111 |
| 6,269,231 | B1 | * | 7/2001  | Castelli et al. ................. 474/101 |
| 2005/0111879 | A1 | * | 5/2005  | Miller et al. ................... 399/116 |
| 2006/0270502 | A1 | * | 11/2006 | Markley et al. ............... 474/111 |

* cited by examiner

*Primary Examiner* — William A Rivera
(74) *Attorney, Agent, or Firm* — Ronald E. Prass, Jr.; Prass LLP

(57) ABSTRACT

A guide useful to install or remove a belt from a belt module is shown. This guide is made up of an elongated structure with a center aperture over which an endless belt is initially draped during installation. Once rotably attached to a belt module, the guide is moved downwardly to form a belt form over a top of the top drive rollers. A tube is attached to a bottom drive roller to help transfer the belt to the bottom drive roller and form the belt around the entire module. Once the belt is slidably positioned adjacent each drive roller, the belt is transferred from the guide and tube to the drive rollers for final installation.

7 Claims, 4 Drawing Sheets

ONE PIECE BELT INSTALLATION/REMOVAL GUIDE

CROSS REFERENCE

Illustrated and disclosed in a co-pending application (U.S. application Ser. No. 12/051,310) owned by the present assignee is an application relating to a guide useful in belt comprising systems used to remove or install these belts. The US patent application based upon U.S. application Ser. No. 12/051,310 is filed in the US Patent and Trademark Office on the same date as the present application. The disclosure of U.S. application Ser. No. 12/051,310 is totally incorporated herein by reference.

This invention relates to a guide useful in belt comprising systems and, more specifically, to a guide used to remove or install these belts.

BACKGROUND

While the present invention of belt installation or belt removal guide can be effectively used in a plurality of different belt configurations, it will be described for clarity as used in electrostatic marking systems such as electrophotography or xerography.

By way of background, in marking systems such as xerography or other electrostatographic processes, a uniform electrostatic charge is placed upon a photoreceptor belt or drum surface. The charged surface is then exposed to a light image of an original to selectively dissipate the charge to form a latent electrostatic image of the original. The latent image is developed by depositing finely divided and charged particles of toner upon the belt or drum photoreceptor surface. The toner may be in dry powder form or suspended in a liquid carrier. The charged toner, being electrostatically attached to the latent electrostatic image areas, creates a visible replica of the original. The developed image is then usually transferred from the photoreceptor surface to an intermediate transfer belt or to a final support material such as paper.

In some of these electrostatic marking systems, a photoreceptor belt or drum surface and an intermediate transfer belt (ITB) is generally arranged to move in an endless path through the various processing stations of the xerographic marking process. In this endless path, several xerographic-related stations are traversed by the photoconductive and ITB belts which become abraded and worn. In several of these belt configurations, in addition to photosensitive and ITB belts, other belts are used such as transfer belts, pre-fuser belts, cleaning belts and the like. Each of these belts is exposed to friction and moved by rollers that provide the belt movement to accomplish the belt purpose. After awhile, especially in high speed systems, the belt needs to be replaced. Also, since the photoreceptor and ITB surface are reusable once the toner image is transferred, the surfaces of these belts are constantly abraded and cleaned by a blade and/or brushes and prepared to be used once again in the marking process.

Image-carrying belts used in color printing processes can be especially difficult to replace and install. In some machines for example, the intermediate transfer belt is over 6-10 feet long. Belt installation requires careful alignment with the belt module to prevent belt and other machine component damage. At even longer belt lengths, the replacement or removal operation is extremely difficult without belt damage occurring.

Even in monochromatic marking systems that use shorter belts for various functions, extreme care must be taken not to damage the belts during installation. In some instances, the belts are constructed of thin flexible polymeric materials that can easily scratch or be damaged during belt replacement or even during original installation.

SUMMARY

While the guide of this invention can be used in both belt installation and belt removal, for clarity it will be described in an installation mode of an ITB. When removing the ITB belt, the reverse procedure is used. Also, the disclosure will define a belt guide in reference to intermediate transfer belts. However, as earlier stated, the present guide is useful in other belt systems, i.e. photoconductive belts, transfer belts, cleaning belts, etc. Embodiments of a belt removal and installation guide of this invention in marking systems provides belt alignment during the removal and installation process with a minimum of belt damage. The guide of this invention comprises a one piece elongated structure having a length substantially the same as the top portion of the belt module. It will have an aperture in about the center so that it could be attached to a plate at the top of the belt module and rotated to a horizontal position during belt installation. The guide is removable from the belt module after belt installation and stored in or outside of the marking machine. These embodiments will be further described in reference to the drawings of this disclosure. As colors are added to the marking systems, belts get longer and the need for guides will be more important. Guides that are stored in housings of the module save time compared to guides that are store elsewhere. Guides stored outside the machine save space inside the machine. Thus, there are advantages to both internally stored and externally stored guides. The scope of this invention includes both these embodiments.

The embodiments herein provide a belt guide that is mounted during use on the belt modules of products that have long transfer belts, especially those in excess of 10 feet in overall length. The installation of long belts is difficult due to their size and scope; therefore, the installation requires care because of the likelihood of damage. It is especially difficult in applications that have the transfer belt module mounted horizontally. The invention focuses on a rotatable guide but includes otherwise movable or hinged guides, if convenient. The guide would protrude toward the front of the machine from the housing at two or more roller positions providing a pre-staging area for the belt. The belt would then be draped in a position close to the actual belt housing but without the clearance issues. The belt would then be manually tensioned as it is slid from the guide of this invention over the rollers of the belt module. After belt installation, the guide would be removed and stored in the machine or elsewhere for future use. The guide of this invention can also be used for removal of the belt but belt damage is not as great an issue then. In removal of the belt, the reverse procedure described herein is used.

An embodiment of the guide of this invention comprises an elongated structure as shown in the drawings and said guide having a length about the same as a top portion of the belt module. The guide is wide enough to support the width of the varied size endless belt to be installed. For a small narrow belt, a narrower width guide will be used. The guide has at least one aperture at its center rotatable portion. This aperture (s) is adapted to be rotably connected to a projection in the upper portion of the belt module so that the guide (as shown in the drawings) is vertically installed in the module in a stand-up mode. The guide is enabled to be rotably moved to a horizontal position when the belt to be installed is draped over the guide. The guide is then moved downwardly (to a 180° horizontal position) with its upper portion supporting the belt. The lower portion of the belt is draped below this guide and a tube X is used to align the belt to a lower roller. This tube X and the belt usually are included in the packaging of the belt sent by the manufacturer. Thus, the loose belt is enabled to be located adjacent and in substantial horizontal alignment with the drive rollers when installing the belt. The belt is then slid inboard onto the rollers from the guide and tube and engages a belt-tightening mechanism (such as a tension roll) to securely attach the belt around the rollers.

The guide is configured so as to accommodate transfer of an endless belt to the drive rollers.

Thus, this invention proposes a design for an Intermediate Transfer Belt ((TB) installation/removal tool. This guide is rotably mounted on a front guide pin on the belt module. It has a guide pin to hold one of the packaging tubes while the remainder of the belt is unrolled vertically. Once unrolled, the packing tubes are removed and the belt is slid over the elongated guide of this invention. The guide is then rotated to a horizontal position, widening the belt to match the top width of the module. The final step before sliding it onto the module is to insert one of the packing tubes into a feature on the bottom of the module which provides a third bottom sliding surface for the ITB. After the belt is slid onto the module, the tool or guide and the packing tube are removed. Removal of a used belt is this process reversed.

DETAILED DISCUSSION OF DRAWINGS AND PREFERRED EMBODIMENTS

Figure 1:
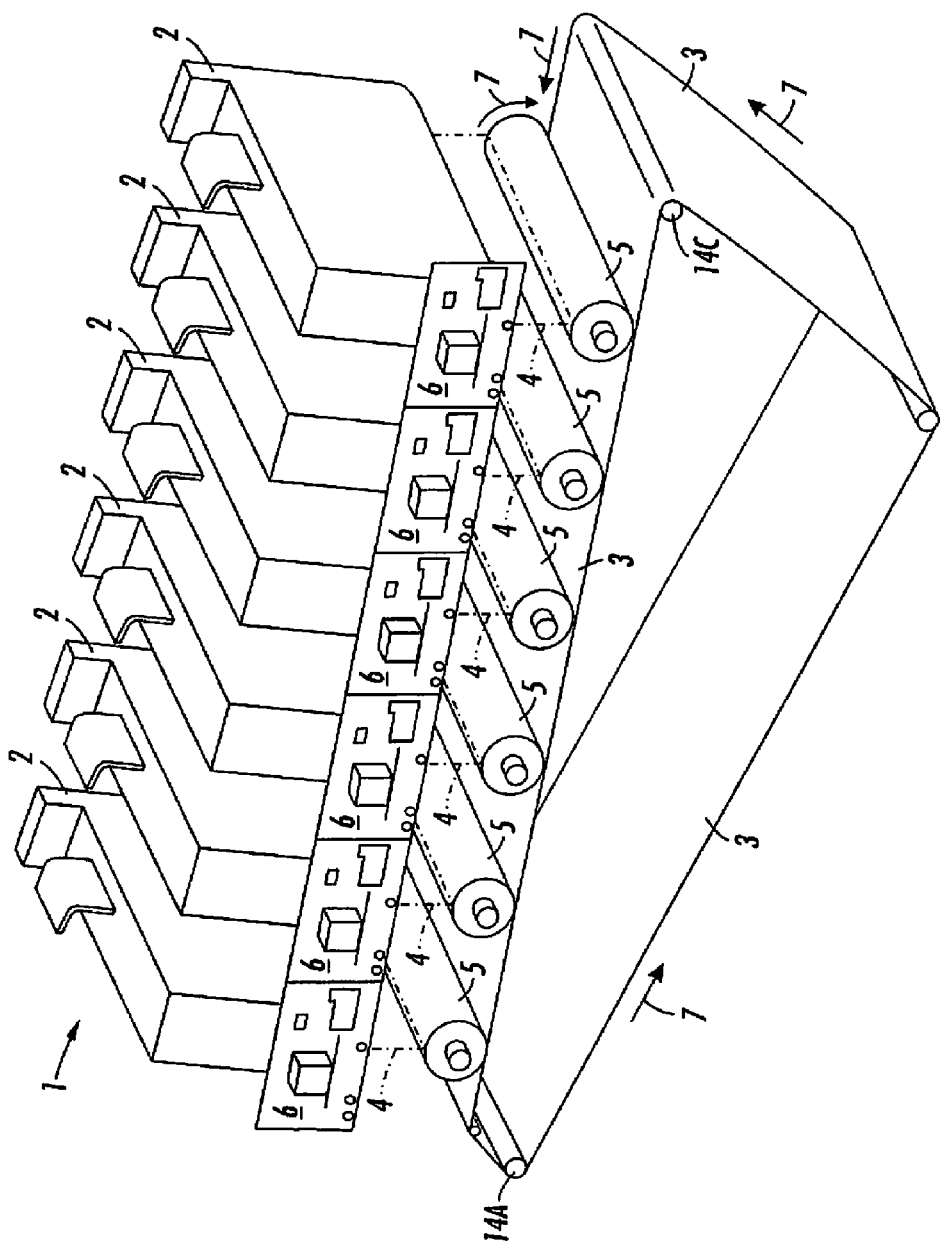
FIG. 1 illustrates a typical marking machine with an endless intermediate transfer belt (ITB).

In FIG. 1, a typical color imaging system 1 is illustrated having an array of raster output scanners (ROS) 2 and their associated photoreceptor drums 5 aligned above an endless intermediate transfer belt 3. Each ROS emits a different image beam 4 on a photoconductive drum 5 to charge the drum's surface where the image for that color will be located. As the drum 5 rotates, the charged regions pick up toner of the color for that particular imaging station and transfer this color image to the surface of the belt 3 so that each colored image is deposited in relation to the previous deposited image. At the end of the process, all six deposited images (that are color developed at each station) are precisely aligned to form the final color image which is eventually transferred to media. The arrows 7 indicate the rotation direction of drum 5 and belt 3. It is in this type system that the guide 8 of this invention can be used (together with a belt containing monochromatic system or any belt containing system).

A typical xerographic imaging system that can employ the guide of this invention as above described, is disclosed in U.S. Pat. No. 6,418,286 B1. This patent disclosure is incorporated by reference into the present disclosure.

Figure 2A:
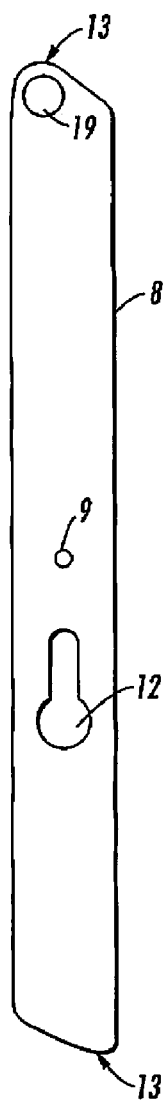
FIG. 2A is a plan view of an embodiment of the elongated guide of this invention.
Figure 2B:
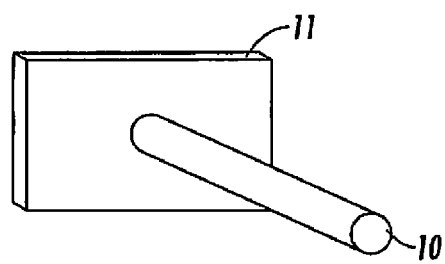
FIG. 2B is a plate in a belt module.

In FIGS. 2A and 2B, a perspective side view of a guide 8 and plate 11 embodiment is shown. The guide 8 comprises an "elongated" guide that is made from a plastic or relatively soft material so as not to damage a belt 3. Materials such as polypropylene, polyurethanes, blow molded plastics, polycarbonates or any other suitable material may be used. The guide has at its center portion an aperture 9 that is adapted to be rotably connected to projections 10 in a plate 11 of a belt module 15. Once connected, the guide 8 is rotably movable on projection 10 somewhat like a propeller. Other connecting means other than apertures-projections may be used such as hinges and the like that will permit the guide to be rotated to a horizontal position. When the endless belt 3 is packaged, it comes with tubes, one of which will fit over the tube connection 19 on guide 8 during belt installation onto guide 8. The other two tubes can be discarded. This tube X can be stored in rounded tubular housing 12 in a guide embodiment as shown in FIG. 2A. Aperture 9 is shown on the same side as this housing 12 for clarity; it can better be positioned on the opposite side of the guide 8 from this housing 12. The end portions 13 of guide 8 are chamfered or rounded to prevent any damage to the belts 3 during installation or belt removal.

Figure 3:
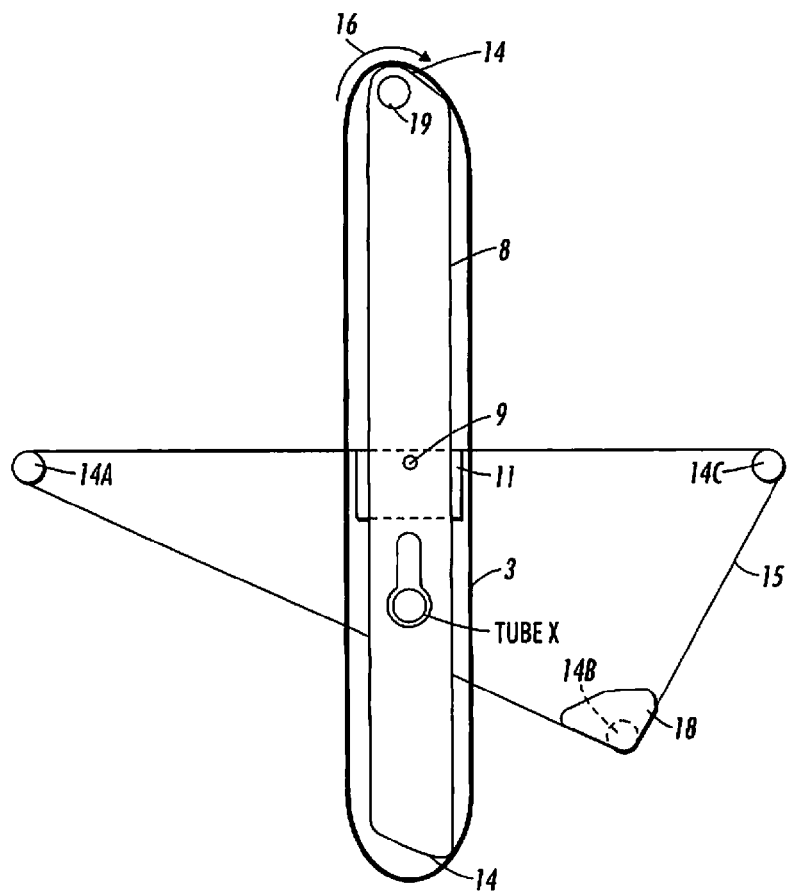
FIG. 3 is a plan view of the initial step used to install an endless belt in a belt module.
Figure 4:
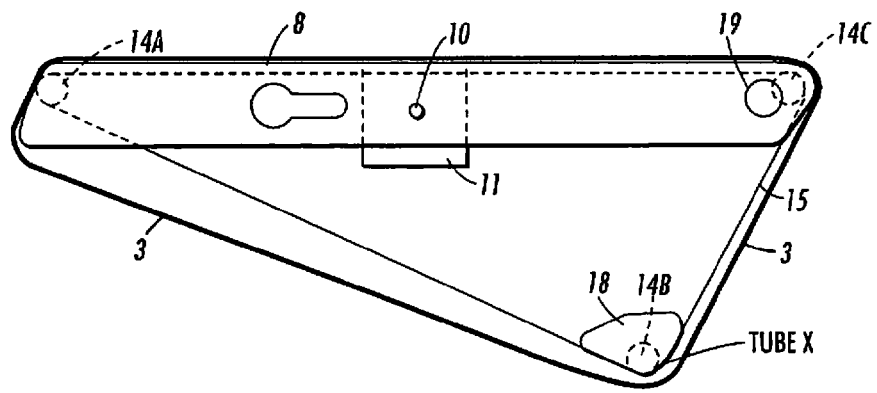
FIG. 4 is a second step showing the guide movement pivoted downwardly with the belt draped over each wing.

In FIGS. 3-4, a sequential belt 3 installation process is illustrated. In FIG. 3, a simple belt module 15 configuration is shown for clarity. The guide 8 is shown with aperture 9 which will be mated or attached to projection 10 in containing plate 11. The guide 8 is in a vertical position with belt 3 (in this case an intermediate transfer belt ITB) draped over the guide 8 as it is moved downwardly in a horizontal position as shown in FIG. 4. The arrow 16 shows the direction of movement of the guide 8 to carry the belt 3 with it. The guide 8 again is rotated on projection 10 of plate 11. Once the guide 8 is fully lowered as shown in FIG. 4, the belt 3 is substantially flat against upper rollers 14A and 14C yet not attached to lower roller 14B. The tube X delivered with the belt packaging and was stored in rounded tubular housing 12 earlier in the procedure is used to place on tube support connection 18 to assist in the eventual installation of the belt 3 over the roller 14B as shown in FIG. 4. Once the belt is draped over rollers 14A, 14B and 14C, roller 14A which is a tension roller is sprung back to its operative position to thereby tighten the belt 3 around rollers 14C, 14A and 14B.

Figure 5:
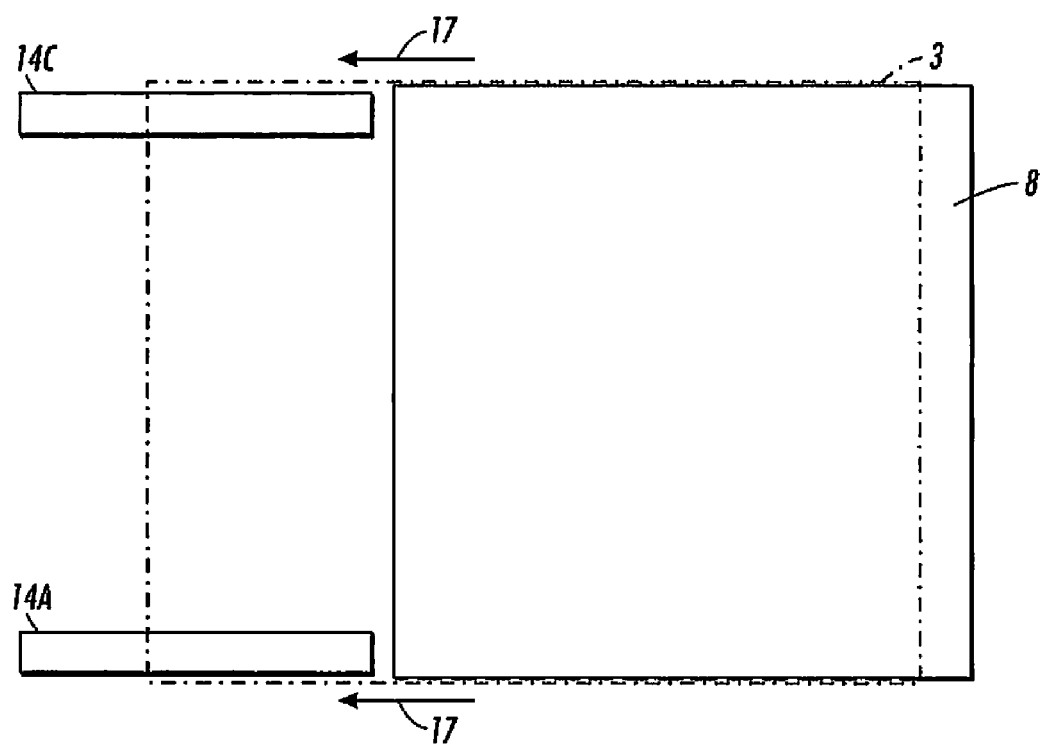
FIG. 5 is a top view showing the movement of the belt from the guide to the drive rollers.

In FIG. 5, a top view of a final step is shown where the belt 3 is transferred from the guide 8 (and tube X) to rollers 14C, 14A and 14B (not shown) is illustrated. The belt is merely pushed from guide 8 and tube X onto rollers 14C, 14A and 14B as shown by arrow 17. Tightening roller 14A is sprung to its operative position to tighten belt 3 around drive rollers 14C, 14A and 14B. The arrows 17 show the transfer movement of belt 3.

Guide 8 is then removed and in one embodiment stored in the housing (not shown). As noted, in other embodiments, the guide 8 can be stored other than in the housing. Also, an extension connection tube support 18 to tubular or tube X is shown for supporting belt 3 around lower roller 14B.

It will be appreciated that variations of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of installing an endless belt in a belt module of an electrostatic marking machine which comprises:
   providing a belt installation guide having an elongated structure and a length substantially the same as a top portion of said module, said guide having a connection aperture in its center portion;

said aperture enabled to be connected to a projection in said module thereby rotably rotatably connecting said guide to said belt module at a top location adjacent to a belt path of said module, loosely draping an endless belt over a top portion of the guide rotably rotatably moving said guide downwardly to carry said supported belt to a substantially horizontal position at a top of said module;

moving said belt around top drive belt rollers in said modules;

moving a tubular extension adjacent a bottom belt drive roller in said module;

sliding said belt inboard from said guide and said tubular extension onto said top and bottom rollers, respectively;

engaging a belt-lightning mechanism to securely attach said belt around said rollers, and in a last step, remove said guide and said tubular extension from said modules.

2. The method of claim 1 whereby said guide and tubular extensions after removal from the modules are stored for further use.

3. The method of claim 1 whereby said guide is provided with at least one aperture for rotatably connection to projections in a plate in a top portion of said module.

4. The method of claim 1 where one of said top rollers is a tension roller that is enabled to secure said belt tightly around said rollers when moved to an original belt driving position.

5. The method of claim 1 wherein said machine is an electrostatic marking apparatus selected from the group consisting of monochromatic systems, color marking systems and mixtures thereof.

6. The method of claim 1 wherein said belt is an intermediate transfer belt.

7. The method of claim 1 wherein said belt is manually pushed over said rollers from said guide and said tubular extensions.

* * * * *